June 5, 1945.　　A. R. J. PONCELET　　2,377,715
TWIST DRILL GAUGE
Filed Aug. 28, 1943
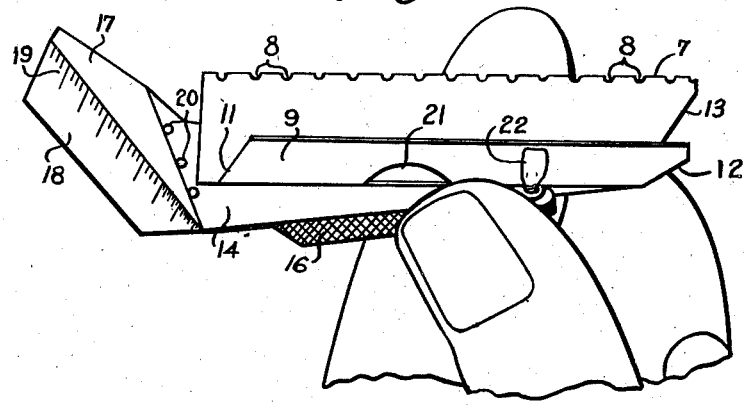
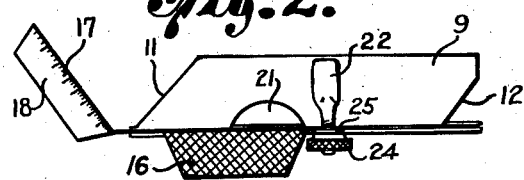
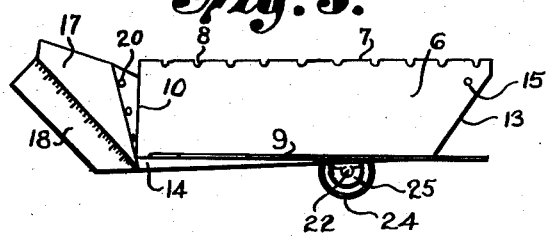
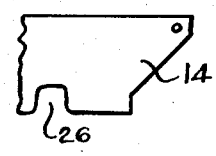
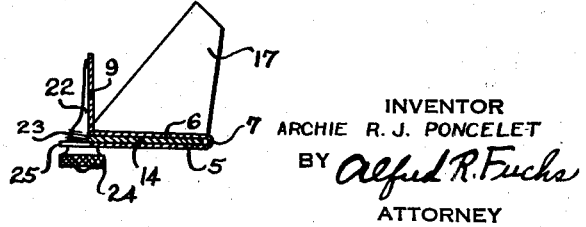
INVENTOR
ARCHIE R. J. PONCELET
BY *Alfred R. Fuchs*
ATTORNEY Patented June 5, 1945

2,377,715

UNITED STATES PATENT OFFICE 2,377,715

TWIST DRILL GAUGE

Archie R. J. Poncelet, West Los Angeles, Calif.

Application August 28, 1943, Serial No. 500,315

9 Claims. (Cl. 33—201)

My invention relates to twist drill gauges, and more particularly to adjustable twist drill gauges.

In sharpening a twist drill, it is necessary that the two cutting edges of the drill be of the same length and extend at the same angle to the axis of the drill and terminate at their inner ends at a point that is the same distance from the axis of the drill, said inner ends of said cutting edges being connected by means of a transverse edge portion extending across the longitudinal axis of the drill, this chisel point, or transverse edge, increasing in width as the diameter of the drill increases.

In order that the drill will cut properly, the two cutting edges must be exactly alike in pitch and length and location relative to the axis of the drill. It is a purpose of my invention to provide a drill gauge whereby this can be accomplished readily and accurately without too much loss of time. My improved gauge comprises a graduated flange or scale, which is utilized for the purpose of determining the length of each of the two cutting edges of the drill and for locating the opposite ends of each cutting edge at the same points relative to the axis of the drill.

My improved gauge further comprises means for determining the proper pitch of the cutting edge, or angular relation to the axis of the drill, so that both cutting edges have the same angular relation to the axis of the drill.

In order that both of these purposes can be carried out accurately and the gauging of the drill accomplished readily to enable the more rapid sharpening of the same in a proper and correct manner, I provide a drill guide in combination with the above referred to gauge, which is adjustable transversely to the gauge, and which comprises abutment means with which the drill is held in engagement, to hold the same in the same relative position with respect to the gauge for gauging each of the two cutting edges. To gauge the cutting edge it is desirable and substantially necessary, that the cutting edge be placed flush with or closely adjacent the edge of the flange having the scale or graduations thereon, so that the length of the cutting edge and the location of the opposite ends of the cutting edge can be accurately determined. After one cutting edge has been brought to such position relative to the scale, the drill is rotated so as to bring the other cutting edge into a corresponding position to the scale, and my improved tool provides guiding means whereby the axis of the drill is maintained in the same position during both of these gauging operations. This is absolutely necessary, as all gauging must be done with reference to the axis of the drill.

More particularly my invention comprises gauging means for twist drills, including a gauge member and a guide member, which are pivotally connected together so that the same can be adjusted angularly relative to each other to adjust the position of the axis of the drill transversely of the gauging member, the gauging member being moved or adjusted relative to the guide member to accomplish this. Furthermore my invention comprises means for locking the guiding and gauging members in their relative adjusted position to maintain the same relationship between said guide and gauge members throughout the gauging of a drill of the particular size for which the device is adjusted.

It is a further purpose of my invention to provide a device of the above mentioned character, which is so constructed and arranged that the length and the pitch of each of the cutting edges of the drill can be readily gauged, an opening being provided between a flange on the guide member with which the drill engages and the pitch gauge flange and graduated gauge flange, through which both the length of the cutting edge and the pitch thereof can be readily observed, and preferably, light openings are provided adjacent the junction of the pitch flange and body portion of the gauge member to provide for the shining of strong light through these openings to make it possible to better observe the cutting edge of the drill.

It is another purpose of my invention to provide a guide member that is so constructed and arranged that small drills can be readily held in firm engagement therewith, a finger opening being provided in the flange of such guide member for this purpose, and which is provided with a clamping member that engages a doubled portion of said guide member to clamp the body portion of the gauge in adjusted position relative to said guide member.

Other objects and advantages of my invention will appear as the description of the drawing proceeds. I desire to have it understood, however, that I do not intend to limit myself to the particular details shown or described, except as defined in the claims.

In the drawing:

Fig. 1 is a view in perspective showing my improved gauge ready for adjustment for gauging a drill of a particular size.

Fig. 2 is a view in elevation, of my improved gauging device.

Fig. 3 is a top plan view of my improved drill gauging device.

Fig. 4 is a transverse sectional view through the same with the parts in position to gauge the smallest size drills for which the device is to be used, and Fig. 5 is a fragmentary top plan view of the gauge member detached.

Referring in detail to the drawing, my improved gauging tool comprises a guide member having a body portion comprising a pair of spaced members 5 and 6, which are connected together by means of a bight portion 7, which, preferably, is provided with a series of openings 8 therein to prevent accumulation of foreign matter between said members 5 and 6, said members 5 and 6 being, of course, formed by bending the metal of the guide member on itself. Due to the provision of the openings 8 and the natural springiness of the metal of which the device is made, the two members 5 and 6 will yield slightly relative to each other. The upper member 6 of the body portion of the gauge is provided with a flange 9 extending perpendicularly thereto, said flange extending along the greater portion of the edge of said portion 6 opposite the bight portion 7, but terminating short of the forward edge 10 of the body portion of the guide member. The forward edge 11 of the flange 9 is inclined rearwardly for a purpose which will become evident below. The rear edge of said flange is cut away at an angle, as indicated at 12, so that small, short drill bits can be held by the right hand in the operation of the tool to gauge a drill bit. The rear edge of the body portion made up of the parallel portions 5 and 6 is similarly cut away at an angle, as indicated at 13, for the same purpose.

Pivotally mounted on the guide member is a gauge member, which has a body portion 14 mounted between the parallel walls 5 and 6 of the body portion of the guide member and pivotally connected therewith by means of a pivot member 15. Said body portion is provided with a depending flange 16, which serves as a finger grip for holding the gauge member in the adjustment and use of the device, said flange 16 being gripped between the thumb and index finger of the left hand in the use of the device and being, prefrably, knurled, as indicated in Figs. 1 and 2, or otherwise roughened to prevent any slipping of the thumb from the same.

The gauge member is provided with a forwardly inclined pitch gauging flange 17 extending at the proper angle to the body portion 14 of the gauge to obtain the desired pitch or angularity of each of the cutting edges of the drill. This angle is, preferably, an angle of 59° to the axis of the drill, as this is a standard that has been adopted for the drills for which the gauge is intended. Extending substantially perpendicularly to the flange 17 is a flange 18, which is provided with a scale 19 along the edge thereof that lies adjacent the junction of the flanges 17 and 18, the graduations of the scale being, preferably, much finer than shown in the drawing, as it would be impossible to show the graduations as close together as these would actually be in practice on the scale in a patent drawing. The graduations, preferably, are 1/64 of an inch apart at the lower portion of the scale, and 1/32 of an inch apart over the balance of the scale. The first graduation on the scale 19, preferably, is in alignment with the top face of the wall 6 of the guide member. The graduations are, preferably, arranged at an oblique angle to the junction of the flanges 17 and 18, the angle of the graduations being, preferably, 60° to a perpendicular to said junction, which makes the reading of the location of the ends of the cutting edge much easier than if these are not arranged at such an angle.

Upon reference to Fig. 2, it will be obvious that quite a large opening is provided between the flange 17 and the inclined edge 11 of the flange 9 to enable the cutting edges of the drill to be readily observed when using the gauge. Furthermore it will be noted that there are openings 20 provided in the gauge adjacent the junction of the flange 17 with the body portion 14 to enable a strong light to be provided back of or underneath the gauge shining through said openings to make the blade edge more readily visible as the same is being gauged.

The flange 9 is provided with a finger opening 21 therein for a purpose to be described below, and has welded thereto the flattened portion of the locking means having the threaded stem portion 23. The locking means further comprises a knurled nut 24 screw-threadedly mounted on the stem portion 23, and an apertured ear 25 projecting from the edge portion of the bottom wall 5 of the guide body member. The threaded stem 23 extends through the aperture in the ear 25, and the body portion 14 is provided with a notch or recess 26 to accommodate the stem 23. By screwing the nut 24 upwardly on the stem 23 into clamping engagement with the ear 25 the two walls 5 and 6 will be clamped together so as to firmly hold the member 14 clamped therebetween against any pivotal movement about the pivot 15. Upon screwing the nut 24 downwardly on the stem the member 14 will be released to permit adjustment of the gauge member relative to the guide member.

In the use of the gauge, the drill that is to be gauged is put in position on the gauging member with the point of the drill toward the pitch gauging flange 17 on the gauge member and with the drill in engagement firmly with the flange 9 and body member of the guide member along the entire length of the flange 9 and the upper member 6 thereof. The gauging tool is held by engaging the index finger and thumb with the flange 16 on the gauge and either the middle, or the middle and third fingers of the left hand with the bight portion 7 of the guide. The drill is held by means of its shank portion with the right hand and with the locking means in unlocked position, the gauge member is moved relative to the guide member until one cutting edge is brought in close alignment with the scale on the flange 18 at its junction with the flange 17. The locking member is then operated to clamp the parts in adjusted position. After such adjustment has been obtained the device is set ready to gauge a drill of that particular size. To gauge the drill, the drill is put in position against the flange 9 and the top wall 6 of the body portion of the gauge and with its forward or cutting end in engagement with the flange 17, and the middle finger of the left hand is placed over the drill to firmly hold it against said flange 9 and wall 6 while the same is rotated by means of the right hand, to successively bring the two cutting edges into alignment with the scale on the flange 18. Both the location of the inner and the outer end, as well as the length of the cutting edge is observed, and sharpening of the gauge and such gauging is continued until the inner end of both cutting edges lie on the same graduation of the scale. If the scale commences at a point such that the bottommost graduation is in alignment with the top face of the wall 6, then the outer end of each cutting blade or edge should be at the zero point or lowermost graduation on the scale. In order to determine that the edge is at the right pitch or angle to the axis of the drill, the person gauging the drill observes whether the cutting edge lies flatly against the flange 17. When no light can be seen between said flange and the cutting edge the pitch of the cutting edge is correct. This test is, of course, also made with both cutting edges of the blade.

What I claim is:

1. A device for gauging twist drill bits, comprising a drill guide, having a drill receiving face and means for limiting movement of a drill transversely of said face, a gauge having a graduated portion thereon, means connecting said guide and gauge for relative adjustment of said gauge and guide transversely of said gauge about an axis perpendicular to said drill receiving face to align the cutting edges of the drill with said graduated portion, and means for locking said gauge and guide in adjusted position.

2. A device for gauging drill bits, comprising a drill guide having a body portion provided with a flange along one margin thereof, a gauge having a body portion pivotally connected to the body portion of said guide, a pitch gauging flange extending at an oblique angle thereto, and a graduated cutting edge gauging flange on said pitch gauging flange, and means for locking said gauge against pivotal movement relative to said guide.

3. A device for gauging drill bits, comprising a drill guide having a body portion provided with a flange along one margin thereof, a gauge having a body portion pivotally connected to the body portion of said guide, a pitch gauging flange extending at an oblique angle thereto, said body portion of said gauge having light openings therein adjacent the junction of said pitch gauging flange therewith, and a graduated cutting edge gauging flange on said pitch gauging flange, and means for locking said gauge against pivotal movement relative to said guide.

4. A device for gauging drill bits, comprising a drill guide having a body portion provided with an upstanding flange along one margin thereof, a gauge having a body portion pivotally connected to the body portion of said guide having a depending finger grip flange along the margin thereof corresponding to that of the guide having said flange thereon, a pitch gauging flange extending at an oblique angle thereto, and a graduated cutting edge gauging flange on said pitch gauging flange, and means for locking said gauge against pivotal movement relative to said guide.

5. A device for gauging drill bits, comprising a drill guide having a doubled body portion provided with a flange along one margin thereof, a gauge having a body portion mounted between the doubled portion of and pivotally connected to the body portion of said guide, a pitch gauging flange extending at an oblique angle thereto, and a graduated cutting edge gauging flange on said pitch gauging flange, and means for locking said gauge against pivotal movement relative to said guide.

6. A device for gauging drill bits, comprising a drill guide having a body portion provided with a flange along one margin thereof, said flange having a finger opening therein at its junction with the body portion and spaced from the longitudinal edge of said flange remote from said junction, a gauge having a body portion pivotally connected to the body portion of said guide, a pitch gauging flange extending at an oblique angle thereto, and a graduated cutting edge gauging flange on said pitch gauging flange, and means for locking said gauge against pivotal movement relative to said guide.

7. A device for gauging drill bits, comprising a drill guide having a doubled body portion provided with a flange along one margin thereof, a gauge having a body portion pivotally connected to the body portion of said guide and lying between the doubled portions of said guide, a pitch gauging flange extending at an oblique angle thereto, and a graduated cutting edge gauging flange on said pitch gauging flange, and a locking member mounted on said flange of said guide and having means engaging the body portion thereof to clamp the body portion of said gauge between said doubled portions of said guide.

8. A device for gauging drill bits, comprising a drill guide having a body portion provided with a flange along one margin thereof, a gauge having a body portion pivotally connected to the body portion of said guide, a pitch gauging flange extending at an oblique angle thereto, and a graduated cutting edge gauging flange on said pitch gauging flange, and means for locking said gauge against pivotal movement relative to said guide, the flange on said guide having its edge nearest said gauge flange spaced therefrom and inclined in divergent relation thereto.

9. A device for gauging drill bits, comprising a drill guide having a body portion provided with a flange along one margin thereof, a gauge having a body portion pivotally connected to the body portion of said guide having a depending finger grip flange thereon, a pitch gauging flange extending at an oblique angle thereto, and a graduated cutting edge gauging flange on said pitch gauging flange, and means for locking said gauge against pivotal movement relative to said guide, the graduations on said cutting edge gauging flange extending at an oblique angle to the junction of said pitch gauging and cutting edge gauging flanges.

ARCHIE R. J. PONCELET.